July 21, 1931.  J. H. MOFFAT  1,815,207
VEHICLE PARKING AND LOCKING DEVICE
Filed Jan. 18, 1929  3 Sheets-Sheet 1
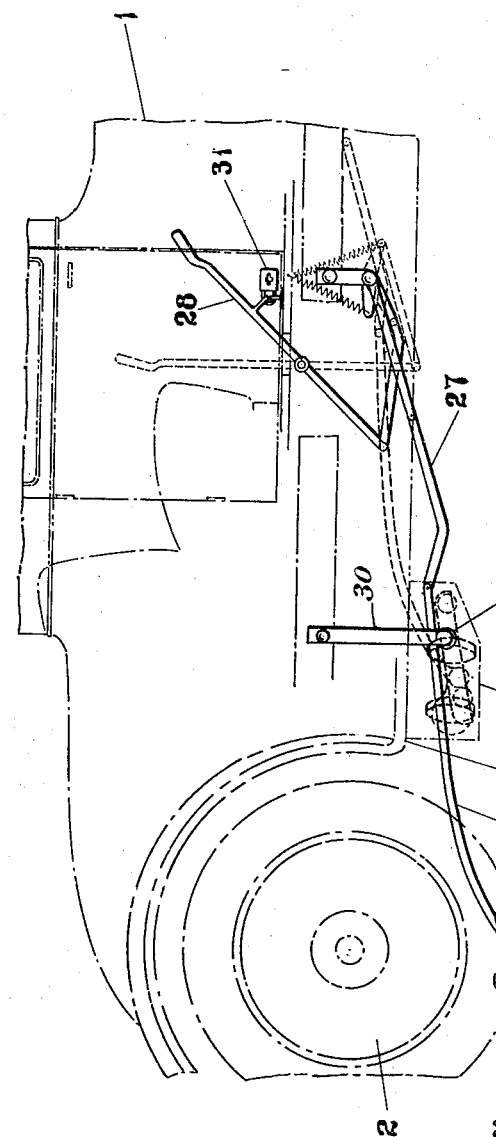
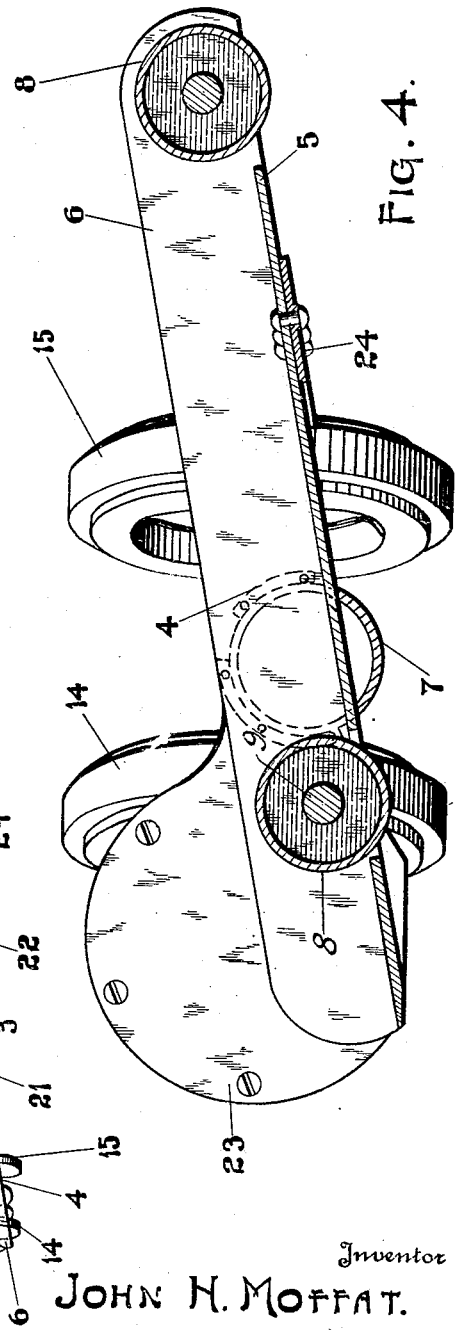
Inventor
JOHN H. MOFFAT.
By Owen H. Spencer
Attorney

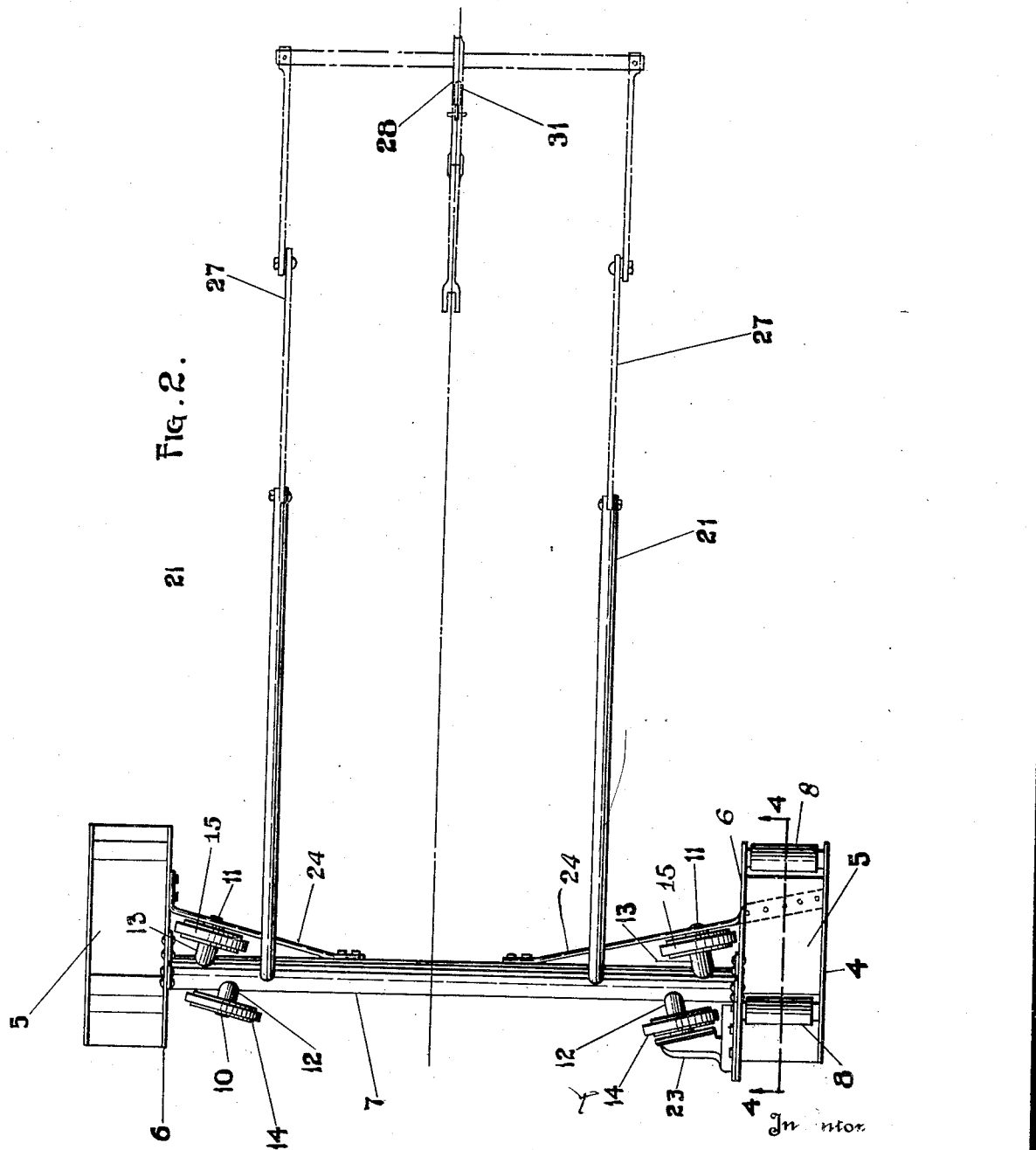

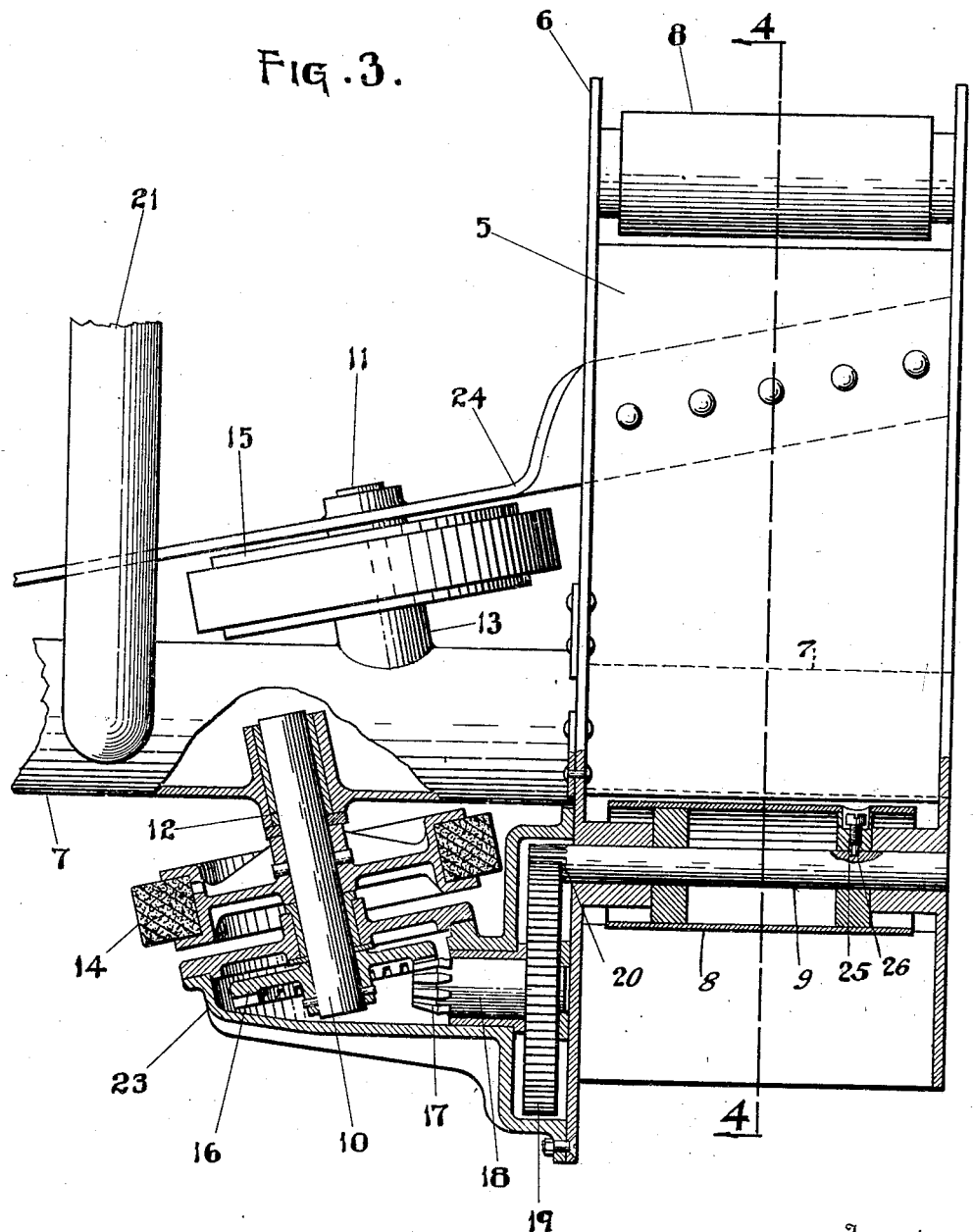

Patented July 21, 1931

1,815,207

UNITED STATES PATENT OFFICE

JOHN H. MOFFAT, OF INDIANAPOLIS, INDIANA

VEHICLE PARKING AND LOCKING DEVICE

Application filed January 18, 1929. Serial No. 333,384.

This invention relates to car parking and raising means, and this application covers certain improvements over my former Patent Number 1,686,460, issued October 2, 1928, and carries claims not included in said former patent, the prime feature of the present invention being the provision of a device that is lighter, more compact in form and size, easier to manufacture, and one that is strong and durable and more readily applied to use or stored beneath parts of the car when not in use.

A further feature of the invention is the provision of a positive drive for the traction wheels of the parking means.

A further feature of the invention is in so constructing the power applying means that traction wheels of considerable diameter may be used without increasing the dimensions of the remainder of the device.

A further feature of the invention is the provision of bracing means for certain parts of the device.

A further feature of the invention is the positioning of the traction wheels on opposite sides of the connecting bar therefor and so positioning said traction wheels that they will travel substantially in an arc of a circle from the center of the front axle of the car.

Other objects and advantages will be hereinafter more fully set forth and pointed out in the accompanying specification.

In the accompanying drawings which are made a part of this application,

Figure 1 is a detail side elevation of a car with the parking device attached thereto, parts being shown in dotted lines.

Figure 2 is a top plan view of the parking device.

Figure 3 is an enlarged top plan view of the driving element of the parking device, showing parts in section.

Figure 4 is a longitudinal sectional view as seen on line 4—4, Fig. 3.

Referring to the drawings in which similar reference numerals designate corresponding parts thruout the several views, 1 indicates the rear portion of an automobile of any conventional type, 2 indicates the driving wheels therefor, and 3 indicates the running board of the car.

When flat to the curb parking is required, considerably difficulty has been encountered in backing and turning the car, when parking space is limited, and to overcome this objectionable feature, a parking means is provided and attached to the under parts of the car in such manner that it can be readily and easily lowered into position to receive the driving wheels of the car and swing the rear portion of the car in either direction, so that the car may be parked or unparked in a space substantially the length of the car.

To this end a pair of shoes 4 is provided, consisting of a bottom wall 5 and side walls 6 and these shoes are fixed rigidly together by means of a bar 7, preferably a section of pipe, a section of the pipe passing beneath each shoe and fastened permanently thereto in any approved manner. Extending transversely of each shoe 4 and between the side walls thereof, is a pair of rollers 8, one of the rollers of one pair being fixed to a shaft 9, so that said shaft will be rotated when the roller thereon is rotated, while the remainder of said rollers run idle. The rollers are arranged to receive the tire of the respective driving wheel 2 of the car when the shoes are introduced beneath the wheels, and as the respective wheel 2 then rests entirely on said rollers, they will be rotated when driving power is applied to said driving wheels, in the act of propelling the car forwardly or rearwardly. In order to swing the rear end of the car towards or away from the curb from power derived from the rotation of the driving wheels 2, a pair of stub shafts 10 and 11, mounted in suitable bearings 12 and 13, respectively, are located near each end of the bar 7, on which are mounted traction wheels 14 and 15, respectively, said pairs of traction wheels supporting the rear portion of the car, when the wheels 2 are located within said shoes.

As best shown in Fig. 3 one of the traction wheels 14 is fixed to one of the shafts 10, and to the same shaft is attached a gear 16, said gear meshing with a cog 17 formed by cutting teeth on the end of a shaft 18. Fixed to the shaft 18 is a gear 19, which meshes with a cog 20 at the inner end of the shaft 9. With this construction, it will be seen that when the roller 8, attached to the shaft 9, is driven by the wheel 2, the traction wheel fixed to the shaft 10 will be positively driven, the direction of travel depending upon the direction of travel of the wheel 2 contacting with the roller fixed to the shaft 9. The gear 16 and the cog 17 are beveled so that the shaft 10 may be set at an angle for causing the traction wheel thereon to describe an arc of a circle radially from the center of the forward axle of the car, the other shaft 10 and the shafts 11 being likewise set at an angle so that the idling traction wheels thereon will travel in the same radial path as the driven traction wheel. The shoes 4 and bar 7 are supported from parts of the car body by means of rods 21, the end portions thereof fixed to the bar 7 being preferably bowed, so that as said rods are moved lengthwise forwardly or rearwardly, the shoes 4 will be quickly raised or lowered with a minimum travel in either direction, said shoes resting beneath the running board when in elevated position, and if desired, a housing 22 may be provided on the under face of the running board, in which the shoes and parts connected thereto will house when elevated.

The gear mechanisms for driving the traction wheels are fully protected from the elements and from injury by means of a casing 23, said casing being fixed to one side wall of one of the shoes 4. In order to economize in space, the shafts 11 are disposed out of alignment with the shafts 10, so that the traction wheels on the shafts 11 will not interfere with the rods 21 and at the same time positioning the traction wheels 15 in closer proximity to the points receiving the weight of the car. The outer ends of the shafts 11 are supported by means of strips 24, connected at one end to the bar 7 and having their outer ends passed beneath and secured to the shoes 4, said straps also serving to brace the forward ends of the shoes. The driving roller 8 is fixed to its shaft 9 by means of a locking screw 25, which is threaded thru parts of the roller and has an anchoring pin 26 at its inner end which enters a recess in the shaft 9 and fixes the roller 8 thereto.

The forward ends of the rods 21 are connected with a series of links and levers 27 and 28, the construction and operation of which are fully set forth in my former Patent Number 1,686,460, the swinging of the lever 28 in opposite directions raising and lowering the shoes 4 and parts associated therewith. The rods 21 are mounted on sheaves 29, which are in turn carried by hangers 30 depending from parts of the car body, hence the operation of moving the rods lengthwise will be facilitated.

As best shown in Fig. 4, the driving roller 8 is below the center of the shaft 18, hence traction wheels of enlarged size may be used without increasing the height and size of the shoes 4, thus reducing the wear and tear incident to smaller traction wheels and better adapting the traction wheels for travel over muddy or snow covered street surfaces.

After the car has been parked it may be securely locked against being driven away by locking the lever 28 in its forward position as shown in Fig. 1 of the drawings, any suitable locking mechanism being provided, such as a padlock 31 as shown. When the lever 28 is locked in its forward position the parking devices will be locked beneath the wheels 2 of the car, hence when power is applied to said wheels, the rear end of the car will merely travel in the arc of a circle and consequently the car cannot be driven away until the lever 28 is unlocked and the parking device removed from beneath the driving wheels 2.

In operation, the forward end of the car is headed in to a point adjacent the curb, practically at the point it will occupy when the car is fully parked, the lever 28 being then operated to lower the parking devices to a position immediately in front of the driving wheels 2. Power is then applied to the wheels 2, as in the act of driving the car forwardly, causing the wheels to travel upwardly onto the shoes 4, one of them resting on the rollers 8 and the other on a non-rotating ledge in the other shoe, the continued rotation of the one driving wheel 2 setting up rotation of the driving traction wheel 14 and causing the rear end of the car to move laterally until the body of the car is substantially in line with the curb line. In unparking the car, power is applied to the wheels 2, as in the act of backing the car, which will result in reverse motion to the driven traction wheel and move the rear end of the car away from the curb a sufficient distance to clear any obstruction in the rear of the car. The lever 28 is again operated for raising the parking device to its elevated position, when the car is further backed until it is clear of forward obstructions, when the car may be driven forwardly in the usual manner.

It is obvious that the gear 16, the cog 17, the gear 19 and the cog 20, considered together, constitute a two stage reduction between the respective traction wheel 14, and the roller 8, by which arrangement the lateral parking movement of the car is comparatively slow, making the parking operation easier to carry out.

When it is desired to use the invention as a vehicle locking device without regard to the parking, the mechanism may be used to elevate two of the vehicle wheels in the same manner as carried out precedent the lateral parking shifting of the car above described, the lock 31 being then applied to lock the vehicle while in the garage or any other place where the apparatus is not needed to reach a suitable parking position.

While the description and drawings illustrate in a general way certain instrumentalities, which may be employed in carrying the invention into effect, it is evident that many modifications may be made in the various details without departing from the scope of the appended claims, it being understood that the invention is not restricted to the particular example herein described.

I claim as my invention:

1. In a car parking device, a pair of wheel supporting shoes; a bar rigidly connecting said shoes; shafts carried by said bar on opposite sides thereof and in pairs, the shaft of one pair being out of alignment with the other shaft of the pair and in substantially radial alignment with the center of the forward axle of the car; straps supporting the outer ends of certain of said shafts and the forward ends of said shoes; traction wheels mounted on said shafts; and means for utilizing the driving force of the wheels of the car for driving one of said traction wheels, whereby the rear end of the car may be swung laterally in either direction.

2. In a car parking device, a pair of shoes, a bar rigidly connecting said shoes, pairs of shafts carried by said bar, a traction wheel mounted on each of said shafts, one of said wheels being fixed to its shaft, a driving roller in one of said shoes, a supporting shaft for said roller, a cog formed on the inner end of said supporting shaft, a gear meshing with said cog, a shaft to which said gear is fixed, a cog formed on one end of said last shaft, a gear fixed to the shaft having the traction wheel fixed thereto, said cogs and gears driving the fixed traction wheel when the driving roller is rotated, and a casing enclosing all of said pinions and gears.

3. In a car parking device, a pair of wheel supporting shoes, a bar to the opposite ends of which said shoes are attached, parts of the bar engaging the inner face of the shoes and parts passing beneath the shoes, a pair of shafts adjacent each end of said bar and on opposite sides thereof, traction wheels mounted on said shafts, means for driving one of said wheels, and a strap at each end of said bar each having one end attached to said bar and its opposite end extended beneath the forward portions of said shoes for bracing and supporting said shoes, one shaft of each pair of shafts being supported at their outer ends by said straps.

In testimony whereof, I have hereunto set my hand this 18th day of February, 1930.

JOHN H. MOFFAT.